United States Patent [19]

Bruno

[11] 4,281,756
[45] Aug. 4, 1981

[54] DISTRIBUTING CONVEYOR INSTALLATION AND CONTROL METHOD THEREFOR

[75] Inventor: Carlo L. Bruno, Oundle, England

[73] Assignee: Alisyncro S.a.s. di Bruno & C., Leini, Italy

[21] Appl. No.: 116,380

[22] Filed: Jan. 29, 1980

[30] Foreign Application Priority Data

Feb. 12, 1979 [IT] Italy ................................ 67291 A/79

[51] Int. Cl.³ ...................... B65G 48/03; B65G 43/10
[52] U.S. Cl. .................................... 198/356; 198/369; 198/460; 198/575
[58] Field of Search ............... 198/460, 356, 575, 577, 198/572, 573, 358, 369, 437

[56] References Cited

U.S. PATENT DOCUMENTS

| 2,497,874 | 2/1950 | Evans et al. | 198/369 |
| 3,429,416 | 2/1969 | Provost et al. | 198/358 |
| 3,933,237 | 1/1976 | Rofterman | 198/572 |
| 4,164,277 | 8/1979 | Fluck et al. | 198/369 |
| 4,197,935 | 4/1980 | Aterianus | 198/460 |
| 4,277,607 | 10/1980 | Malavenda | 198/460 |

Primary Examiner—Joseph E. Valenza
Assistant Examiner—Brian Bond
Attorney, Agent, or Firm—Sughrue, Rothwell, Mion, Zinn and Macpeak

[57] ABSTRACT

A conveyor installation has a principal line of conveyance from which products are removed at a plurality of spaced locations. Between each removal location, the principal line of conveyance comprises a haltable, two-speed accumulation conveyor and a step-advance conveyor advanceable at two different frequencies. The installation is arranged to monitor the presence of products at the loading and discharge ends of each accumulation conveyor and at the loading end of each step-advance conveyor, whereby to appropriately control the conveyors to compensate for the randomness of product distribution on the principal line of conveyance resulting from random product removal therefrom.

5 Claims, 8 Drawing Figures

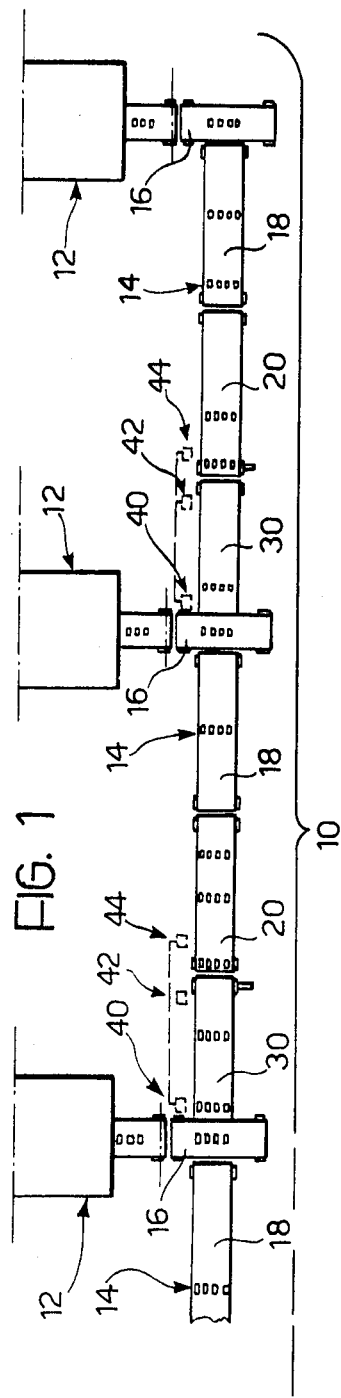
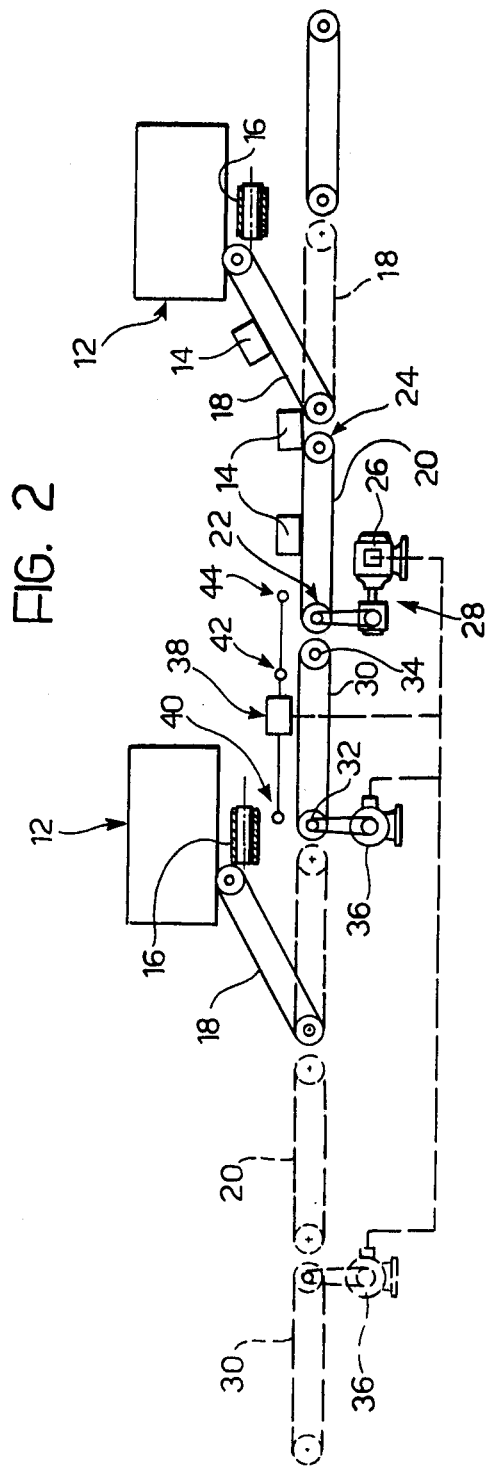
FIG. 1
FIG. 2

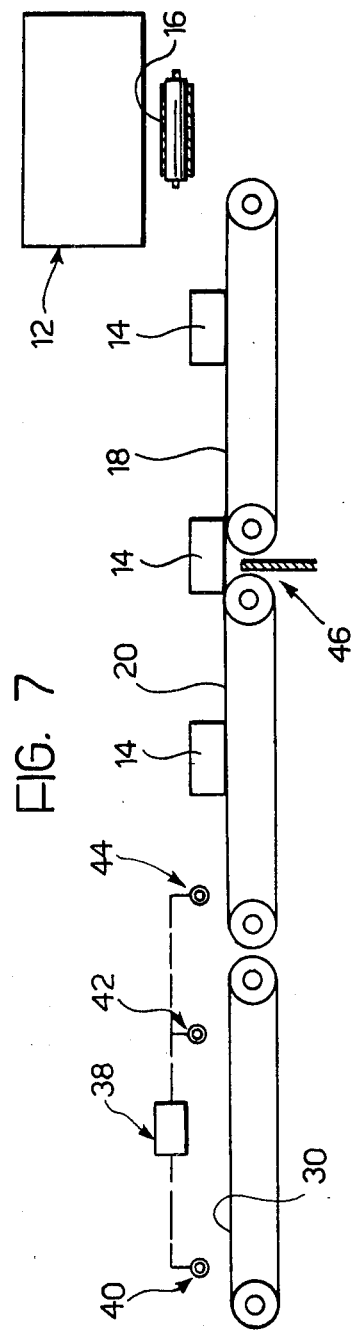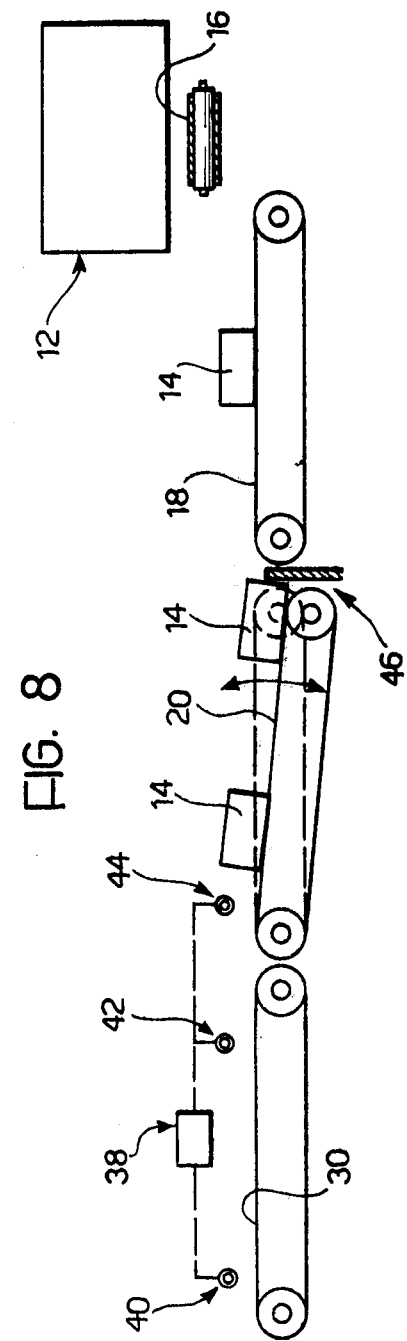

DISTRIBUTING CONVEYOR INSTALLATION AND CONTROL METHOD THEREFOR

The present invention relates to conveyor installations for the distribution of products to a plurality of work stations, and in particular, but not exclusively, to such installations for distributing food products (such as confectionery products) to a series of packing machines. The invention also relates to methods of controlling such installations.

Distributing conveyor installations are known of the type comprising a plurality of longitudinally-aligned conveyors forming a principal line of conveyance for the transport of transverse rows of products therealong from an input end of the line, a plurality of transverse conveyors located at spaced intervals along said principal line of conveyance and extending transversely thereto, each transverse conveyor being arranged to receive rows of products from said principal line and to feed them to one or more respective work stations, and a plurality of transfer means each associated with a respective transverse conveyor and selectively operable to transfer a row of products from the principal line of conveyance to the transverse conveyor associated with the transfer means or to allow said row to pass on along the principal line of conveyance.

In the known installations of this type, each of the said transfer means is activated to transfer a product row to its associated transverse conveyor in response to a demand for a row of products from the corresponding work station independently of similar demands from the adjacent work stations. For this reason, there results, downstream of each transverse conveyor, a random distribution of the transverse rows of products along the principal line of conveyance. Thus it may happen that, when a work station demands a transverse row of products, the latter may not be available on the principal line of conveyance, and it may also happen that some of the transverse rows of products reach the end of the principal line of conveyance without having been fed to a work station, despite the supply rate of products to the input end of the principal line of conveyance being equal to or even less than the total intake capacity of the work stations.

It has already been proposed in an unpublished patent application of the same Applicant (Italian Application Ser. No. 67154-A/77 filed on 25th/1/1977) to obviate the disadvantage of the random distribution of the transverse rows of products downstream of each transverse conveyor by providing the transfer means, in addition to its other constitutent elements, with a deviator device which may be moved between an inactive position and an active position in order to deviate transverse rows of products from the principal line of conveyance to a secondary line of conveyance, which extends parallel to the direction of motion of the principal line of conveyance and which comprises, in series, a first and a second accumulation conveyor.

The object of the present invention is to provide a conveyor installation of the type initially indicated which is capable of dealing more effectively with the random distribution of products downstream of each transverse conveyor and which furthermore permits an accumulation of the products on the conveyors of the principal line of conveyance should the situation arise for a limited period of time that the supply of products to the principal line of conveyance is greater than the total intake capacity of the work stations.

In order to achieve this object the present invention provides a conveyor installation of the aforesaid type, in which upstream of each transverse conveyor, the principal line of conveyance comprises the following elements associated with that conveyor:

an accumulation conveyor the loading end of which is arranged to receive transverse rows of products coming downstream on the principal line of conveyance, a step-advance conveyor positioned with its loading end adjacent the discharge end of the accumulation conveyor and arranged to intermittently advance product rows received from the accumulation conveyor towards the transfer means of the transverse conveyor with which said accumulation and step-advance conveyors are associated, first drive means selectively operable to effect movement of the accumulation conveyor at a first or at a second speed, respectively less than and greater than the speed of supply of products to the input end of the principal line of conveyance, and to effect stopping of the accumulation conveyor, and second drive means for effecting the intermittent advance of the step-advance conveyor at a first frequency related to the frequency of supply of products of the principal line of conveyance or at a second frequency related to the intake capacity of the work station or stations fed by the associated transverse conveyor, the installation further comprising for the accumulation conveyor and step-advance conveyor associated with each transverse conveyor:

a first, a second and a third sensor respectively arranged to detect the presence of a row of products on said principal line of conveyance in correspondence with the loading end of the accumulation conveyor, the discharge end of the accumulation conveyor, and the loading end of the step-advance conveyor, and control means connected to the said sensors and arranged to control the said first and second drive means of the associated accumulation and step-advance conveyors such that:

(I) unless otherwise controlled, the accumulation conveyor moves at its second speed and the step-advance conveyor advances intermittently at its first frequency, (II) the accumulation conveyor is controlled to move at its first speed and the step-advance conveyor is controlled to advance at its second frequency when said third sensor detects the presence of a product row in the stop period comprised between two successive step movements of the step-advance conveyor, and (III) the accumulation conveyor is stopped when, during the operation of the step-advance conveyor at its second frequency, said second and third sensors both detect the presence of product rows in the stop period comprised between two successive step movements of the step-advance conveyor, said control means being further arranged to cause the accumulation conveyor associated with the transverse conveyor next upstream to change from its second to its first speed and the corresponding step-advance conveyor to change from its first to its second frequency of advance when, during operation at its second frequency of the step-advance conveyor associated with said control means, all three sensors detect the presence of product rows in the stop period comprised between two successive step movements of the step-advance conveyor.

Due to the foregoing characteristics the installation acts to re-establish, upstream of each transverse conveyor, a uniform distribution of the transverse rows of products along the principal line of conveyance, cancelling spaces which had been left vacant by the transfer of product rows off the principal line to the upstream work stations. Furthermore, the installation according to the invention makes it possible to accumulate product rows and therefore to increase the density of product rows on the principal line of conveyance upstream of each transverse conveyor when the supply of products to the principal line of conveyance is greater than the total intake capacity of the work stations.

A conveyor installation embodying the invention will now be particularly described, by way of example, with reference to the accompanying diagrammatic drawings, in which:

FIG. 1 is a plan view of part of the conveyor installation;

FIG. 2 is a side elevation of a downstream end section view of the installation;

Figure 3:
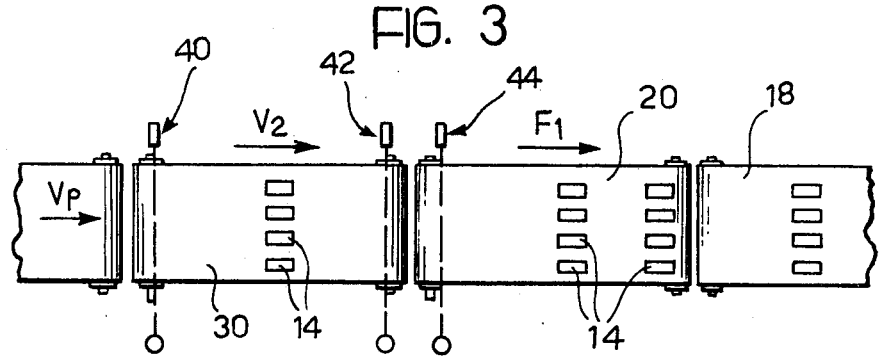

FIGS. 3 to 6 show diagrammatically in plan form four different operating states of the installation, and FIGS. 7 and 8 are diagrammatic, elevational views of part of a modified form of the installation, showing the installation in two different operating states, The conveyor installation now to be described is arranged to distribute rows of food products, particularly confectionary products, to a series of packing machines. The installation comprises a principal line of conveyance 10 the downstream end portion of which is shown in FIG. 1 together with the last three packing machines 12 (that is, the three packing machines furthest downstream in relation to the direction of conveyance of products along the principal line 10). The said principal line of conveyance 10 comprises a plurality of longitudinally-aligned linear conveyors arranged to transport rows of products 14, fed to the input or loading end of the line 10, to transverse conveyors 16.

The conveyors 16 extend transversely with respect to the principal line of conveyance 10 and are each associated with a respective packing machine 12 arranged adjacent to the line. In the example shown, the products 14 are fed to the principal line of conveyance 10 in transverse rows each comprising four products side by side.

FIG. 2 shows the downstream end section of the principal line of conveyance 10 which feeds the products 14 to the last two packing machines 12 of the installation. Upstream of each transverse conveyor 16 selectively-operable transfer means are interposed in the principal line of conveyance 10. The transfer means take the form of a deviator conveyor 18 which can be moved between two extreme positions respectively indicated in FIG. 2 by a continuous line and by a dashed line. With reference to the deviator conveyor 18 shown in FIG. 2 as associated with the last packing machine 12, in its position indicated by a continuous line, the said conveyor 18 transfers the products 14 to the transverse conveyor 16 of the associated packing machine 12, while in its position shown with a dashed line, the deviator conveyor 18 is arranged to transfer the products 14 to the downstream end of the principal line of conveyance 10.

The displacement of each deviator conveyor 18 between its two extreme positions is effected by a control device (not shown) in dependence on the demand for products 14 by the packing machine 12 associated with that conveyor 18. This control device can be of any suitable form known per se and will therefore not be described in further detail.

The principal line of conveyance comprises upstream of each deviator conveyor 18 a step-advance conveyor 20, which at its loading end passes around a driving roller 22 and, at its discharge end, around a return roller 24 arranged adjacent to the loading end of the deviator conveyor 18. The driving roller 22 is rotatably driven by a motor 26 with the interposition of a friction clutch 28. The friction clutch 28 is engaged and disengaged cyclically in order to cause intermittent advance of the step-advance conveyor 20. The principal line of conveyance 10 further comprises upstream of each step-advance conveyor 20 an accumulation conveyor 30 which at its loading end passes around a driving roller 32 and, at its discharge end, around a return roller 34 arranged adjacent to the loading end of the subsequent step-advance conveyor 20. The driving roller 32 is rotatably driven by a two-speed motor 36.

Upstream of each packing machine 12 there is thus arranged a group of three conveyors (conveyors 18, 20, 30) which are associated with that machine, the accumulation conveyor 30 of one group being arranged adjacent the deviator conveyor 18 of the upstream conveyor group (for example, the accumulation conveyor 30 associated with the last packing machine 12, has its loading end adjacent the deviator conveyor 18 which is associated with the penultimate packing machine 12).

Associated with the conveyors 20 and 30 of each conveyor group is a corresponding electrical control unit 38 which is arranged to control the operation of the motor 26 and clutch 28 of the conveyor 20 and the motor 36 of the conveyor 30. Designating the speed with which the products 14 are fed to the input of the principal line of conveyance 10 by $V_p$, each two-speed motor 36 is arranged to drive its associated accumulation conveyor 30 at speeds $V_1$ and $V_2$ which are respectively less than and greater than the said speed $V_p$. The control unit 38 is arranged to control the engagement and disengagement of the friction clutch 28 transmitting drive to the associated step-advance conveyor 20 so as to selectively cause the intermittent advance of that conveyor 20 either at a first frequency $F_1$, which is approximately equal to the frequency of input of products 14 to the principal line of conveyance 10, or alternatively, at a second frequency $F_2$ which is related to the intake capacity of the packing machine 12 associated with the adjacent deviator conveyor 18.

Each control unit 38 operates in dependance on output signals from three photo-electric sensors 40, 42 and 44. These sensors 40, 42 and 44 each comprise a photoelectric cell and means for generating and directing a light beam onto the cell. The photo-electric sensors 40 and 42 are arranged in correspondence with the loading end and the discharge end respectively of the associated accumulation conveyor 30. The photo-electric sensor 44 is arranged in correspondence with the loading end of the associated step-advance conveyor 20. The light beams generated by the photo-electric sensors 40, 42 and 44 are directed across the corresponding conveyor 20 or 30 so as to cross the path of products 14 moving along the principle line of conveyance 10.

As is indicated by the dashed line in FIG. 2 leading from the last control unit 38 to the motor 36 of the accumulation conveyor 30 associated with the penultimate packing machine 12, each control unit 38 is also arranged to effect control over the next upstream section of the principal line of conveyance 10 under certain conditions to be described hereinafter.

The operation of the conveyor installation will now be described.

As indicated in FIG. 3, in the normal working state of the installation in which the intake capacity of the packing machines 12 is greater than the supply of products 14 to the principal line of conveyance 10, the accumulation conveyors 30 advance at the speed $V_2$, whilst the step-advance conveyors 20 advance intermittently at the frequency $F_1$ in order to feed the products 14 to their respective packing machines 12 or to the subsequent section of the principal line of conveyance 10.

Figure 4:
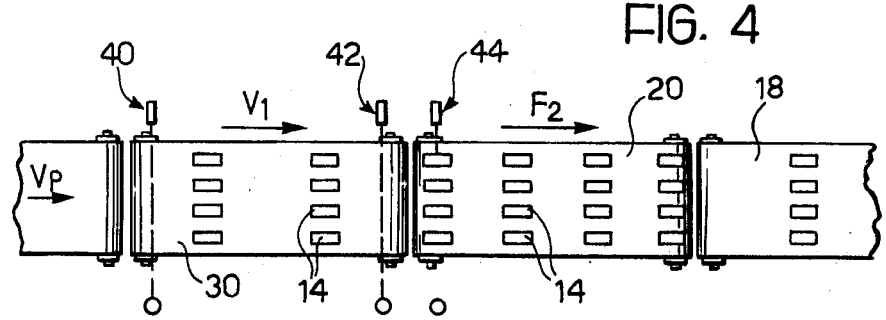
Figure 5:
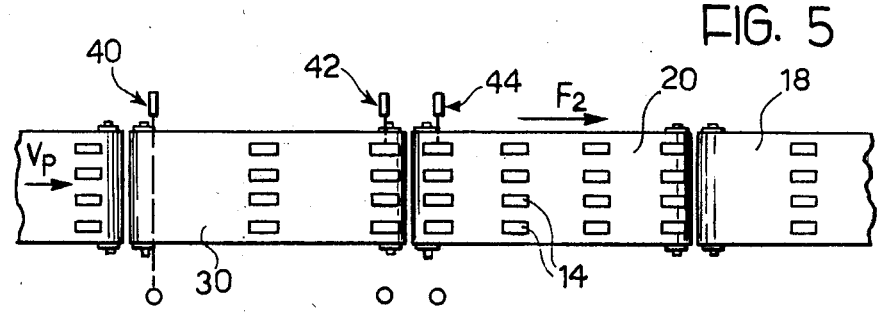
Figure 6:
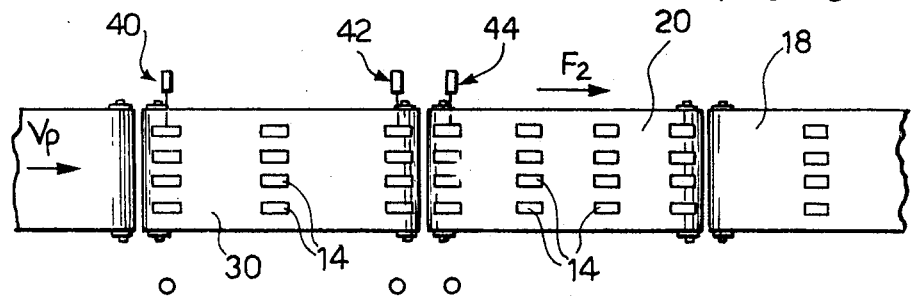

If the flow of products 14 fed to the principal line of conveyance 10 exceeds the total intake capacity of the packing machine 12, the situation diagrammatically shown in FIG. 4 arises, in which the step-advance conveyor 20 positioned upstream of one of the packing machines 12 becomes crammed with products 14. In this situation, the beam of the photo-electric sensor 44 positioned adjacent the loading end of this step-advance conveyor 20 remains interrupted throughout the stop period comprised between two successive advancing movements of the step-advance conveyor 30. In response to the resultant change in the output signal from the photo-electric sensor 44, the corresponding control unit 38 acts on its associated motors 26 and 36 to advance the crammed step-advance conveyor at frequency $F_2$ and to slow the associated accumulation conveyor 30 to the speed $V_1$. As a result, products 14 coming from upstream of this accumulation conveyor 30 now begin to accumulate on the conveyor 30. For the duration of the state of saturation of the packing machines 12, as soon as a transverse row of products 14 interrupt the beam of the photo-electric sensor 42, the control unit 38 stops the motor 36, thereby halting the accumulation conveyor 30 (FIG. 5). The products 14 coming from the upstream section of the principal line of conveyance 10 continue to accumulate on the accumulation conveyor 30 until this conveyor also becomes completely crammed with transverse rows of products 14. In this situation (diagrammatically shown in FIG. 6) the beams of all three photo-electric sensors 40, 42 and 44 are interrupted by a respective transverse row of products 14 and, as a result, the control unit 38 acts on the motor 36 which drives the accumulation conveyor 30 associated with the next-upstream packing machine 12 to change the speed of this conveyor from $V_2$ to $V_1$. In response to this change of speed the control unit 38 associated with the said next-upstream machine, changes the frequency of advance of the associated step-advance conveyor from the value $F_1$ to the value $F_2$ so as to adjust this conveyor to the rate of transfer of products 14 from the principal line 10 to said next-upstream packing machine 12. Thus upstream of the said next-upstream packing machine 12 there is established the situation already shown in FIG. 4 in which the products 14 may also be accumulated. If the state of saturation of the machines 12 continue to exist, then in the manner described above, the conditions are produced, upstream of each packing machine 12, which allow an accumulation of products 14 pending the supply of products to the principal line of conveyance 10 again becoming less than the total intake capacity of the packing machines 12. As soon as this latter state prevails, the control units 38 progressively act to re-establish the situation in which the accumulation conveyors 30 and the step-advance conveyors 20 are advanced at the speed $V_2$ and at the frequency $F_1$ respectively.

In the conveyor installation illustrated in FIGS. 1 to 6, the alignment devices normally provided in installations of this type to ensure transverse alignment of the products in a row, have not been shown but would be arranged upstream of each packing machine 12. In the conveyor installation illustrated in FIGS. 7 and 8, there is shown a simplified form of a product alignment device described in Italian patent application Ser. No. 70063-A/76 filed by the present Applicants and dated Dec. 22nd, 1976.

In the installation shown in FIGS. 7 and 8, the discharge end of each step-advance conveyor 20 is movable between a transfer position (FIG. 7) and a product alignment position (FIG. 8). In front of the loading end of the deviator conveyor 18 there is mounted a crosspiece 46 which extends across the entire width of the conveyor at a level below the upper pass of this conveyor. At the discharge end of the step-advance conveyor 20 means (not shown) are provided to cyclically move the conveyor 20 between its two positions described above (one possible form of such means being shown in detail in the Italian patent application referred to above). As may be seen in FIG. 8, when the discharge end of the step-advance conveyor 20 is in its alignment position, the crosspiece 46 projects above the upper pass of this conveyor so that products 14 belonging to the same row will be moved up against the said crosspiece 46 and become transversely aligned. Subsequently, the discharge end of the step-advance conveyor 20 is brought into the transfer position to allow the realigned transverse row of products 14 to pass from the step-advance conveyor 20 to the deviator conveyor 18. The repeated cyclic movement of the discharge end of the step-advance conveyor 20 make it possible to transversely align the products 14 of each row transferred from the conveyor 20 to the subsequent deviator conveyor 18.

In the preceding description, the transfer means serving to transfer the product rows from the principal line of conveyance onto the transverse conveyors, are shown as movable deviator conveyors 18, but clearly other forms of transfer means are possible. Thus, for example, the transfer means could be of the type illustrated and described in the U.S. Pat. No. 3,429,416.

Furthermore, each transverse conveyor could be arranged to feed the product rows to two or more packing machines.

What is claimed is:

1. A conveyor installation for the distribution of transverse rows of products to a plurality of work stations, said installation comprising a plurality of longitudinally-aligned conveyors forming a principal line of conveyance for the transport of said transverse rows of products therealong from an input end of the line, a plurality of transverse conveyors located at spaced intervals along said principal line of conveyance and extending transversely thereto, each transverse conveyor being arranged to receive rows of products from said principal line and to feed them to a respective work station, and a plurality of transfer means each associated with a respective said transverse conveyor and selectively operable to transfer a said row of products from the principal line of conveyance to the associated transverse conveyor or to allow said row to pass on along the principal line of conveyance, said principal line of conveyance comprising upstream of each transverse conveyor, the following elements associated with that conveyor;

an accumulation conveyor the loading end of which is arranged to receive transverse rows of products coming downstream on the principal line of conveyance, a step-advance conveyor positioned with its loading end adjacent the discharge end of the said accumulation conveyor and arranged to intermittently advance product rows received from said accumulation conveyor towards the transfer means of the transverse conveyor with which said accumulation and step-advance conveyors are associated, first drive means selectively operable to effect movement of said accumulation conveyor at a first or at a second speed, respectively less than and greater than the speed of supply of products to the input end of the principal line of conveyance, and to effect stopping of said accumulation conveyor, and second drive means for effecting the intermittent advance of said step-advance conveyor at a first frequency related to the frequency of supply of products to the principal line of conveyance or at a second frequency related to the intake capacity of said work station fed by the associated said transverse conveyor, the installation further comprising for the said accumulation conveyor and step-advance conveyor associated with each transverse conveyor:

a first, a second and a third sensor respectively arranged to detect the presence of a said row of products on said principal line of conveyance in correspondence with the loading end of the accumulation conveyor, the discharge end of the accumulation conveyor, and the loading end of the step-advance conveyor, and control means connected to the said sensors and arranged to control the said first and second drive means of the associated accumulation and step-advance conveyors such that:

(I) unless otherwise controlled, the accumulation conveyor moves at its said second speed and the step-advance conveyor advances intermittently at its said first frequency, (II) the accumulation conveyor is controlled to move at its said first speed and the step-advance conveyor is controlled to advance at its said second frequency when said third sensor detects the presence of a said product row in the stop period comprised between two successive step movements of the step-advance conveyor, and (III) the accumulation conveyor is stopped when, during the operation of the step-advance conveyor at its second frequency, said second and third sensors both detect the presence of product rows in the stop period comprised between two successive step movements of the step-advance conveyor, said control means being further arranged to cause the accumulation conveyor associated with the transverse conveyor next upstream to change from its second to its first speed and the corresponding step-advance conveyor to change from its first to its second frequency of advance when, during operation at its second frequency of the step-advance conveyor associated with said control means, all three sensors detect the presence of product rows in the stop period comprised between two successive step movements of the step-advance conveyor.

2. An installation according to claim 1, wherein each said sensor is constituted by a photo-electric sensor comprising a photo-cell and means arranged to direct a light beam across the principal line of conveyance onto said photo-cell, the passage of a product row along the principal line of conveyance past the sensor causing an interruption of said beam.

3. An installation according to claim 1 or claim 2, in which the transfer means associated with each transverse conveyor conprises a linear deviator conveyor interposed in said principal line of conveyance with its loading end arranged to receive product rows from the step-advance conveyor associated with the same transverse conveyor, the discharge end of the deviator conveyor being movable between a first position in which product rows are fed to the associated transverse conveyor and a second position in which product rows are fed to the downstream portion of the principal line of conveyance.

4. An installation according to claim 3, wherein a transverse abutment element is interposed between the discharge end of the step-advance conveyor and the loading end of the deviator conveyor at a level below that of the loading end of the working pass of the deviator conveyor, the discharge end of the step-advance conveyor being cyclically movable between:

(a) an upper position in which it is operative to transfer product rows onto the loading end of the deviator conveyor, and (b) a lower position in which it is operative to effect alignment of products in a row by bringing them into abutment with said transverse element.

5. A method of controlling a distributing conveyor installation provided with a principal line of conveyance from which products being transported therealong can be removed at a plurality of spaced locations, said principal line of conveyance comprising, between each said removal location, a haltable two-speed accumulation conveyor followed by an associated step-advance conveyor advanceable at two different frequencies, said control method comprising the operations of:

monitoring the said principal line of conveyance in correspondence with the loading and discharge ends of each accumulation conveyor, and the loading end of each step-advance conveyor in order to detect the presence of products thereon, unless otherwise controlled, causing each accumulation conveyor to move at its fast speed and its associated step-advance conveyor to advance intermittently at its high frequency, causing a said accumulation conveyor to move at its slow speed and its associated step-advance conveyor to advance at its low frequency when the presence of a product is detected at the loading end of that step-advance conveyor in the stop period comprised between two successive step movements of the step-advance conveyor, causing a said accumulation conveyor to stop when, during the operation of its associated step-advance conveyor at its low frequency, the presence of products is detected both at the discharge end of the accumulation conveyor and at the loading end of the step-advance conveyor in the stop period comprised between two successive step movements of the step-advance conveyor, and causing the accumulation conveyor associated with the transverse conveyor next upstream to change from its fast to its slow speed and the corresponding step-advance conveyor to change from its high to its low frequency of advance when, during operation of a said step-advance conveyor at its low frequency the presence of products is detected at the loading end of that step-advance conveyor and at the loading and discharge ends of the associated accumulation conveyor in the stop period comprised between two successive step movements of the step-advance conveyor.

* * * * *